United States Patent [19]

Kitano et al.

[11] Patent Number: 5,446,841
[45] Date of Patent: Aug. 29, 1995

[54] MULTI-PROCESSOR SYSTEM HAVING SHARED MEMORY FOR STORING THE COMMUNICATION INFORMATION USED IN COMMUNICATING BETWEEN PROCESSORS

[75] Inventors: Masahiro Kitano, Hiratsuka; Yoshitaka Ohfusa; Katsuya Kohda, both of Yokohama; Keiichi Sasaki, Hadano; Hiroyuki Okura, Hadano; Katsumi Takeda, Hadano, all of Japan

[73] Assignee: Hitachi, Ltd., Tokyo, Japan

[21] Appl. No.: 898,688

[22] Filed: Jun. 15, 1992

[30] Foreign Application Priority Data

Jun. 15, 1991 [JP] Japan .................. 3-170548

[51] Int. Cl.6 .................. G06F 12/08; G06F 13/00
[52] U.S. Cl. .................. 395/200; 395/800;
395/325; 364/228.1; 364/228.9; 364/230;
364/DIG. 1
[58] Field of Search .............. 395/800, 375, 425, 400,
395/200, 725, 325; 364/200, 900, 468;
340/825.02, 825.16

[56] References Cited

U.S. PATENT DOCUMENTS

| 3,346,851 | 10/1967 | Thornton et al. | 340/172.5 |
| 3,593,300 | 7/1971 | Driscoll, Jr. et al. | 364/200 |
| 4,181,937 | 1/1980 | Hattori et al. | 395/250 |
| 4,240,143 | 12/1980 | Beseher et al. | 395/325 |
| 4,445,174 | 4/1984 | Fletcher | 395/425 |
| 4,564,903 | 1/1986 | Guyette et al. | 364/300 |
| 4,608,631 | 8/1986 | Stiffler et al. | 395/325 |
| 4,622,631 | 11/1986 | Frank et al. | 395/800 |
| 4,698,766 | 10/1987 | Entwistle et al. | 364/468 |
| 4,709,325 | 11/1987 | Yajima | 395/575 |
| 4,937,825 | 6/1990 | Ballard et al. | 371/20.1 |
| 5,142,683 | 8/1992 | Burkhardt, Jr. et al. | 395/725 |
| 5,185,872 | 2/1993 | Arnold et al. | 395/375 |
| 5,201,040 | 4/1993 | Wada et al. | 395/400 |
| 5,276,440 | 1/1994 | Jolissaint et al. | 340/825.02 |

OTHER PUBLICATIONS

Akira Kabemoto et al., "The Architecture of the sure system 2000 communications processor", IEEE Micro 1991, pp. 28-31 & 73-78.

Primary Examiner—Alyssa H. Bowler
Assistant Examiner—Meng-Ai T. An
Attorney, Agent, or Firm—Antonelli, Terry, Stout & Kraus

[57] ABSTRACT

An information processing system comprises: plural processors; a shared memory connected to the plurality of processors for enabling communication between the processors; a unit disposed in the shared memory for storing information for specifying a processor connected thereto; and a unit for checking, when a first processor communicates with a second processor, whether or not the first and second processors are connected to the shared memory for direct access thereto by referring to the information storing means. A method of communication between processors used with a multiprocessor system, comprises the steps of: storing information for specifying a processor connected to the shared memory for direct access thereto in a predetermined register of the shared memory; feeding a communication instruction for instructing a first processor to communicate with a second processor via the shared memory; checking, in response to the communication instruction, whether or not the first and second processors are connected to the shared memory to enable direct access; storing communication information from the first processor in the shared memory, in response to confirmation that the first and second processors are connected to the shared memory; feeding a communication read interruption from the shared memory to the second processor; and reading out, in response to the communication read interruption, the communication information from the shared memory to feed the communication information to the second processor.

6 Claims, 7 Drawing Sheets

MULTI-PROCESSOR SYSTEM HAVING SHARED MEMORY FOR STORING THE COMMUNICATION INFORMATION USED IN COMMUNICATING BETWEEN PROCESSORS

BACKGROUND OF THE INVENTION

The present invention relates to a novel configuration for communication between processors in a multi-processor system in which a plurality of central processing units (CPUs) are coupled to one or more shared memories, and a communication method used therewith.

In a tightly coupled multi-processor system (TCMP), one operating system is provided and unified management is performed for the configuration of processors by the operating system. Moreover, a connection path between the processors is fixed by hardware.

On the other hand, for example to an information processing system in which a plurality of processors are operated by independent operating systems, respectively, and are loosely coupled to one another through a common memory (shared memory), is described in Japanese patent un-examined publication No. JP-A-64-78361 (corresponding to copending U.S. patent application Ser. No. 07/209,073 filed Jun. 20, 1988), U.S. Pat. No. 5,201,040. In JP-A-64-78361, it is described that an instruction equal to a signal processor instruction, used for communication between the processors, is used between the processors by the loosely coupled multi-processor system through the shared memory to perform the communication. However, it is not described that a processor number and a shared memory number are dynamically changed to perform the communication. Further, in JP-A-64-78361, it is not also described that when a processor of a virtual machine (hereinafter, referred to as simply "a virtual processor" when applicable) simulated on a real machine performs the communication with another 10 virtual processor through the shared memory, that communication is performed without reading out the storage data of the shared memory in order to recognize a virtual processor number.

In the technology described in JP-A-64-78361, it is not taken into consideration that when the communication between the processors is performed through the shared memory, the connection path between the processor and the shared memory, or a processor number and a shared memory number, are not changed without stopping the system. Then, there arises a problem in that if the system configuration or the like is changed, the whole system must be stopped.

Moreover, in the case where the communication between the virtual processors is performed through the shared memory, the storage data of the shared memory is read out to recognize a virtual processor number. Therefore, in the communication between the processors, there arises another problem in that the communication can be performed until the storage data is frequently read out from the shared memory to go through the complicated procedure.

SUMMARY OF THE INVENTION

It is therefore an object of the present invention to provide a multi-processor system and a method of communication between processors which are capable of changing the connection path between the processor and the shared memory, or a processor number and a shared memory number, without interrupting or stopping the whole system, in the specification of a call processor number, when communication between the processors is established through the shared memory, and to further provide a multi-processor system and a method of communication between processors which are capable of readily recognizing a virtual processor number without reading out the storage data from the shared memory, thus performing the communication through a simple procedure, when communication between the virtual processors is established through the shared memory.

It is another object of the present invention to provide a multi-processor system and a method of communication between processors in which, when communication between the processors is established through the shared memory, a calling processor is capable of readily recognizing that a called processor is inoperable because its power supply is turned off, or the called processor has been reset, and further to provide a multi-processor system and a method of communication between processors in which when communication between the processors is established through the shared memory, the calling processor is capable of readily recognizing a calling processor number, a number of the shared memory constituting the communication path, and a called processor number.

In order to attain the above objects of the present invention, according to the present invention, there is provided an information processing system which includes a plurality of processors; a shared memory connected to the plurality of processors, communication information being transmitted between the processors through the shared memory; a unit disposed in the shared memory for storing information for specifying the processor which is connected to the shared memory so as to be directly accessible thereto; and a unit for checking, when the first processor intends to communicate with the second processor of the plurality of processors, whether or not the first and second processors are connected to the shared memory so as to be directly accessible thereto, by referring to the information storing unit.

Moreover, in order to attain the above objects, according to the present invention, there is provided a method of communication between processors, used with a multi-procossor system, including the steps of storing information for specifying a processor connected to a shared memory so as to be directly accessible thereto in a predetermined storage area of the shared memory; feeding a communication instruction for instructing that, within a plurality of processors, the first processor will communicate with the second processor via the shared memory; checking, in response to the communication instruction, whether or not the first and second processors are connected to the shared memory so as to be directly accessible thereto, on referring to the predetermined register, by the shared memory; storing, in response to the confirmation that the first and second processors are connected to the shared memory so as to be directly accessible thereto, communication information from the first processor in the shared memory; feeding a communication read interruption from the shared memory to the second processor; and reading out, in response to the communication read interruption, the communication information from the shared memory to feed the communication information to the second processor.

Immediately after the power supply is turned on, in the shared memory, the values of numbers of I/O ports to which the associated processors are connected are not certain, and the tag for representing whether or not the connected processor is available in a reset state. The operating system on each processor set a number of its processor and a number of the I/O port to which its processor is connected in the shared memory which was specified by the exclusive instruction. At this time, the same processor number is prevented from being set in one shared memory because the duplication check has already been performed sequentially between the processor number and the set processor number. However, the same I/O port number may be set to the different processor numbers.

Thereafter, when the operating system on a certain processor intends to communicate with the operating system on other processor, each of the two operating systems recognizes a number of the processor of the other party in accordance with a predetermined protocol, and then, that processor number and a number of the shared memory constituting the communication path are specified to issue an instruction used exclusively for the communication. Further, in the case where the configuration of the processor is changed and the connection path to the shared memory is changed during the communication, the operating system again sets a processor number and an I/O port number, whereby it is possible to continue the communication with the associated processor.

Moreover, when the processor power supply is turned off or the processor is reset, the tag of the corresponding processor number is reset. Thus, the calling processor can readily recognize that the called processor is inoperable because the power supply is turned off, the processor is reset or the like.

DESCRIPTION OF THE PREFERRED EMBODIMENTS

The preferred embodiments of the present invention will hereinafter be described with reference to the accompanying drawings.

Figure 1:
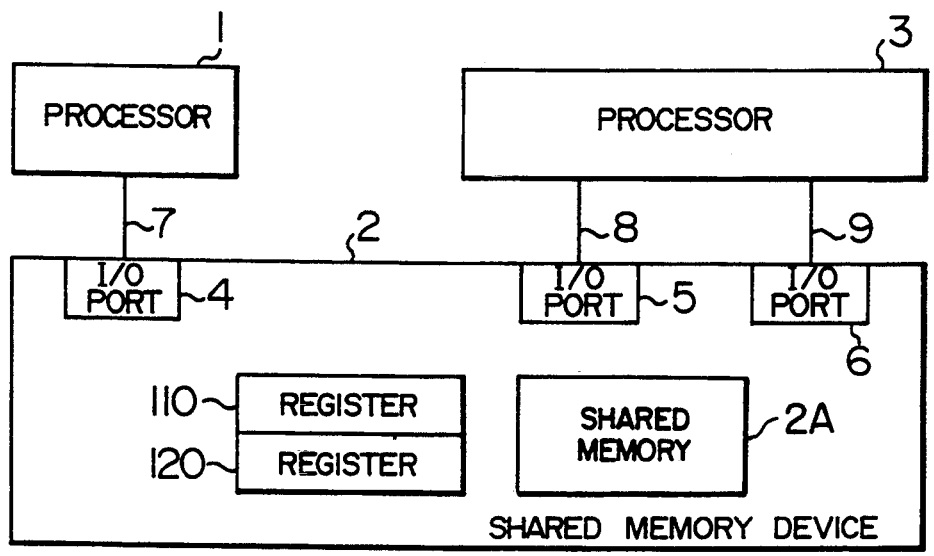
FIG. 1 is a block diagram showing a configuration of one embodiment of a multi-processor system according to the present invention.
Figure 2:
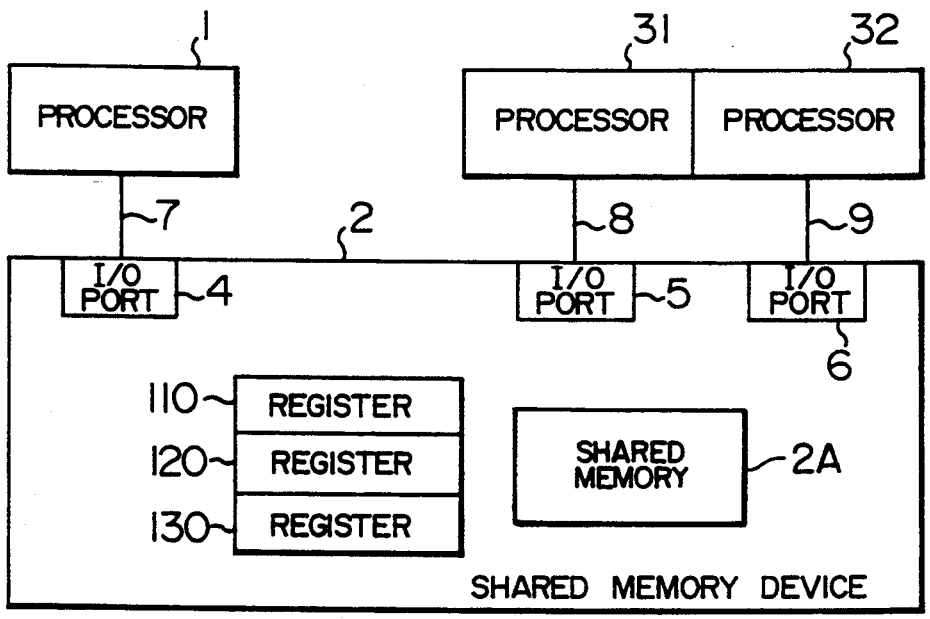
FIG. 2 is a block diagram showing a configuration when one processor shown in FIG, 1 is divided into two processors.

FIG. 1 is a block diagram showing a configuration of an embodiment in which a processor 1 and a processor 3 are connected to a shared memory device 2. The processor 1 performs read/write from or to the shared memory device 2 through an interface 7. The processor 3 has two interfaces 8 and 9 to the shared memory device 2. In this configuration, there is taken into consideration the separate operation employed as the realization system for the labor saving operation, the parallel maintenance and the like of the large machine. That is, when the whole processor is operated by one operating system (OS), the interfaces 8 and 9 are regarded as one interface and used by the processor 3. On the other hand, in the case where the processor 3 is operated as if divided into two independent processors 31 and 32 as shown in FIG. 2, the interfaces 8 and 9 are independently operated corresponding to the processors 31 and 32, respectively.

In FIG. 1, the processor 3 is generally made up of a plurality of instruction processing units, and one of the interfaces 8 and 9 is used depending on which of the instruction processing units were the read/write instruction from or to the shared memory 2A.

Figure 3:
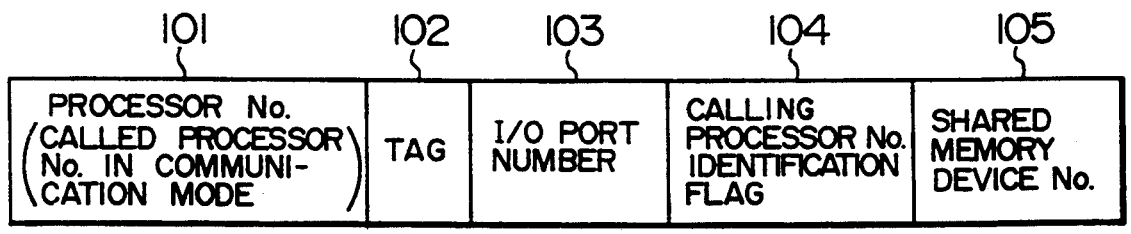
FIG. 3 is a view showing the arrangement of the contents of processor connection information stored in a shared memory.

In the shared memory device 2, I/O ports 4, 5 and 6 are provided in the interfaces 7, 8 and 9, respectively, and registers 110, 120 and 130 for storing processor connection and communication interruption information 100 having the format as shown in FIG. 3 are prepared. The register 110 corresponds to the processor connected to the I/O port 4, the register 120 corresponds to the processor connected to the I/O port 5, and the register 130 corresponds to the processor connected to the I/O port 6. In FIG. 3, a processor number 101 represents a number of the processor connected to the register of interest, a tag 102 indicates whether or not the connected processor is available, and an I/O port number 103 represents a number of the I/O port of interest. Moreover, during the communication between the processors, the processor number 101 represents a called processor number, a calling processor number identification flag 104 has a flag for every processor in order to identify a calling processor number and indicates whether or not the processor of interest issued a communication control instruction, and a shared memory number 105 represents a number of the shared memory of interest.

Figure 4:
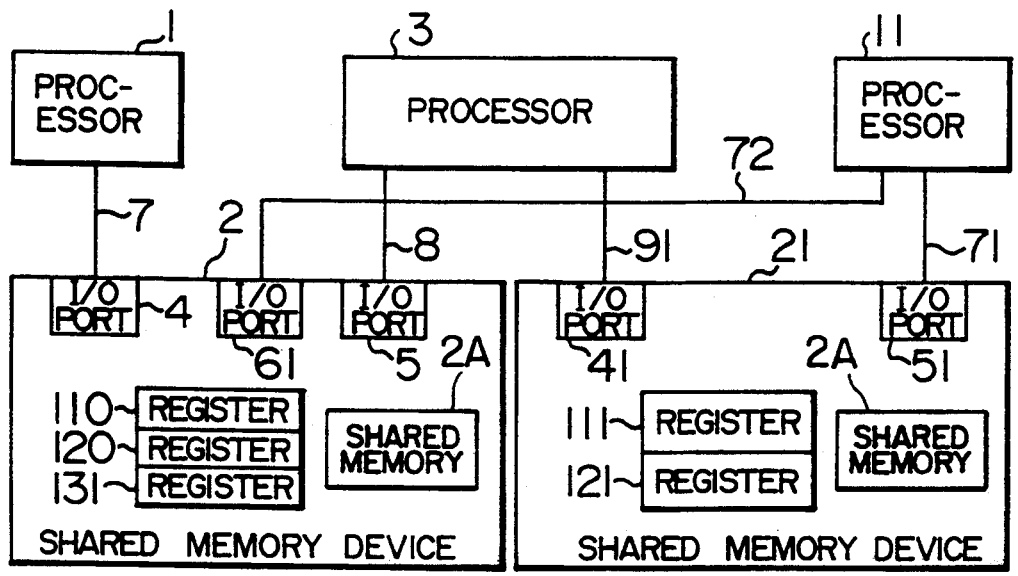
FIG. 4 is a block diagram showing a configuration of another embodiment of the multiprocessor system according to the present invention.

FIG. 4 is a block diagram showing a configuration of another embodiment in which the processor 1 and the processor 3 are connected to a shared memory device 2, and the processor 3 and a processor 11 are connected to the shared memory 21.

Figure 5:
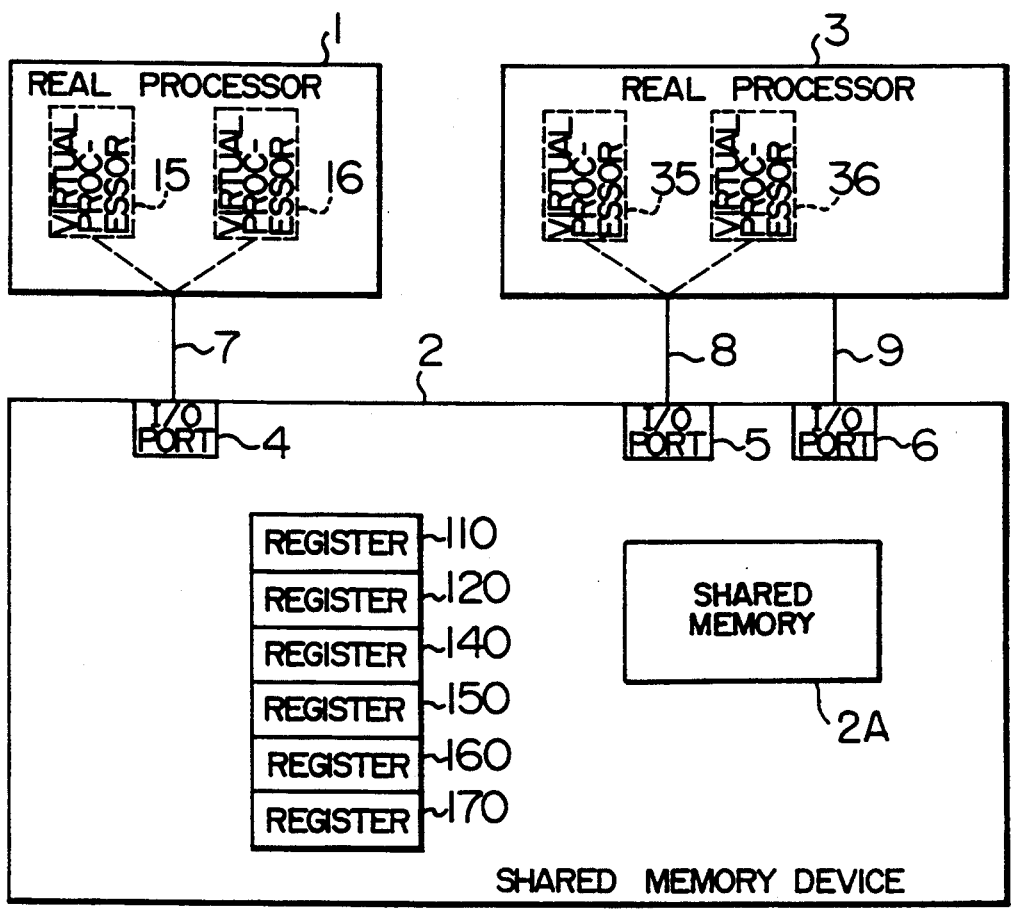
FIG. 5 is a block diagram showing a configuration of an embodiment of a virtual multiprocessor system according to the present invention.

FIG. 5 is a block diagram showing a configuration of an embodiment in which the processor 1 and the processor 3 support virtual processors 15 and 16, and virtual processors 35 and 36, respectively.

The description will hereinbelow be given as to the operation when the processor 1 intends to communicate with the processor 3 through the I/O ports 4 and 5 in the shared memory device 2.

Figure 6:
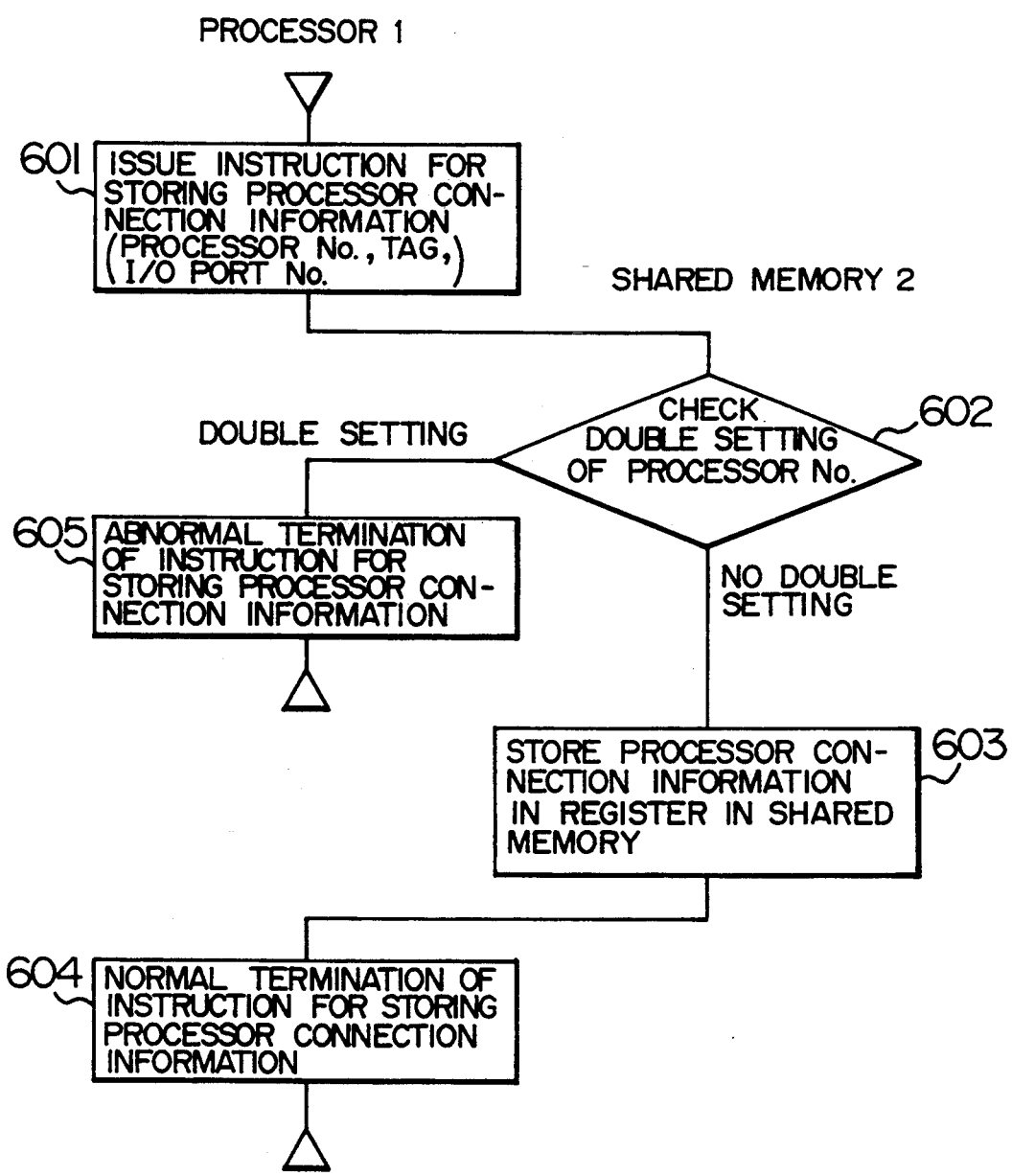
FIG. 6 is a view showing a processing flow chart for setting processor connection information.

First, the description will be given to the operation of setting the processor connection information to the registers 110 and 120 in the shared memory 2 on referring to the flow chart of FIG. 6. Immediately after the power supply is turned on, in the shared memory device 2, the values of the processor numbers and the I/O port numbers of the registers 110 and 120 prepared in the shared memory device 2 are not certain, and the corresponding tags are reset.

In the initial program load (IPL) just after turning the power supply on, the OS which operates the processor 1 issues an instruction for storing the processor connection information (the processor number="1" the tag is available, and the I/O port number="4") to the register 110 in the shared memory device 2 through the interface 7 and the I/O port 4 (Step 601). In the shared memory device 2, it is confirmed that the processor number="1" is not set to any of the registers 110 and 120 (Step 602). Then, the specified processor connection information (the processor number="1", the tag is available, and the I/O port number="4") is stored in the register 110 in the shared memory device 2 (Step 603). In the processor 1, the storage of the processor connection information in the shared memory device 2 is recognized and the instruction for storing the processor connection information is normally terminated (Step 604). Incidentally, if the same processor number is set to the registers 110 and 120 in the shared memory device 2, that instruction is abnormally terminated (Step 605). In the same manner, the OS which operates the processor 3 issues an instruction for storing the processor connection information (the processor number="3", the tag is available, and the I/O port number="5") to the register in the shared memory device 2 through the interface 8 and the I/O port 5 (Step 601). In the shared memory device 2, it is confirmed that the processor number="3" is not set to any of the registers 110 and 120 (Step 602). Then, the specified processor connection information (the processor number="3", the tag is available, and the I/O port number="5") is stored in the register 120 in the shared memory device 2. In the processor 3, the storage of the processor connection information in the shared memory device 2 is recognized, and then, the instruction for storing the processor connection information is normally ended (Step 604). Incidentally, if the same processor number is set to the registers 110 and 120 in the shared memory device 2 (Step 605), that instruction is abnormally terminated.

The above-mentioned operations of setting the processor connection information are performed, individually in turn, in the shared memory device 2 so that the double setting of the processor number does not occur. Moreover, while not illustrated in FIG. 4, in the system generation, the processor number is previously set so as not to be repeated. Under this condition, before the communication between the processors is started, the OSs of the processors read out the above processor connection information so that they can recognize a number of the processor connected to the shared memory device 2.

Figure 7:
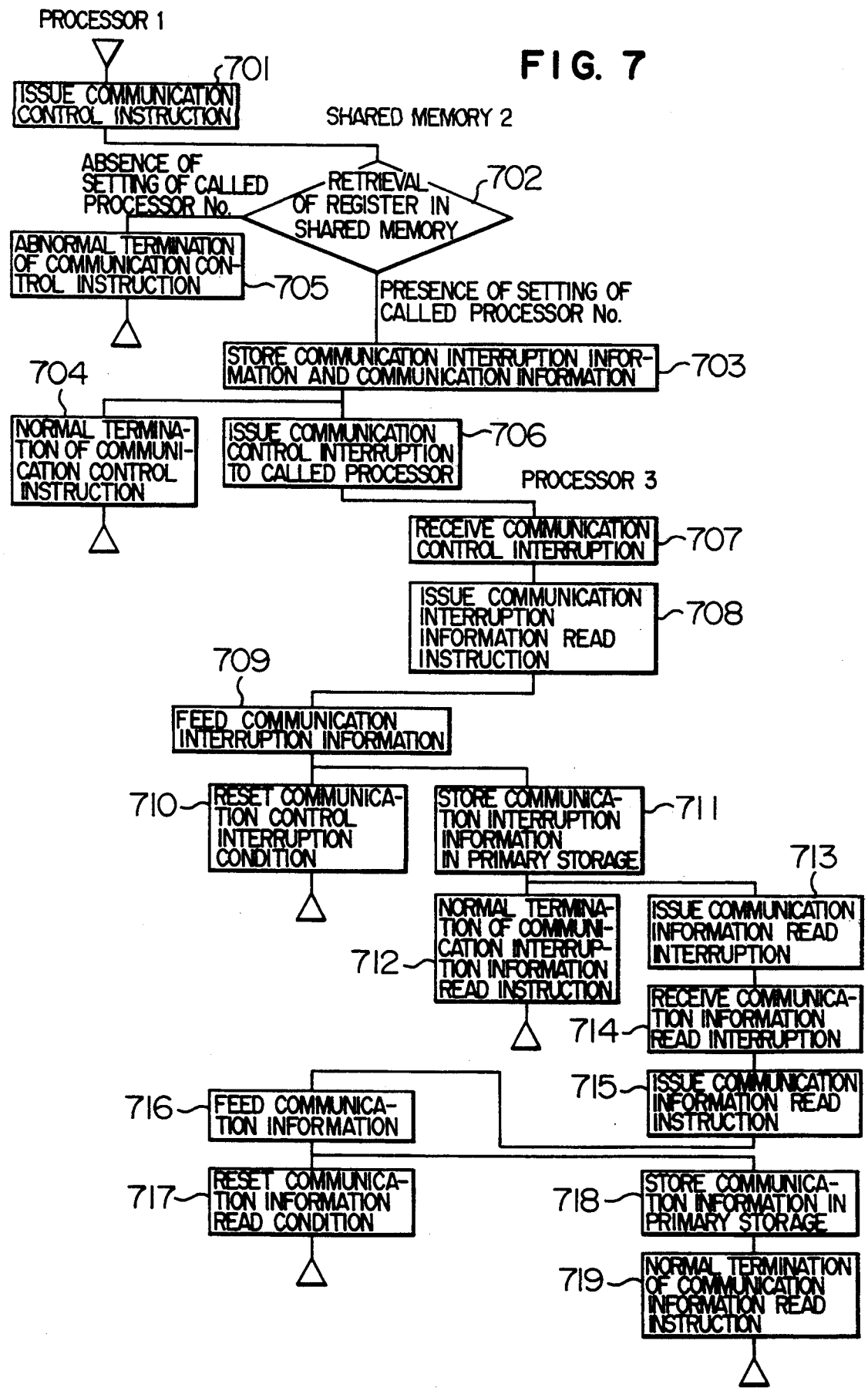
FIG. 7 is a view showing a processing flow chart useful in explaining communication between processors.

Next, the description will be given to the operation of transferring the communication information from the processor 1 to the processor 3 through the I/O ports 4 and 5 of the shared memory device 2, on referring to the flow chart of FIG. 7.

The OS which operates the processor 1 issues a communication control instruction for specifying the called processor number="3" in order to transfer communication information to the processor 3 to the shared memory device 2 through the interface 7 (Step 701). When receiving the communication control instruction, the shared memory device 2 retrieves the processor connection information of the registers 110 and 120 in the shared memory device 2 to recognize, on the basis of the processor connection information of the register 120, that communication with the processor 3 can be established through the I/O port 5 and the interface 8 (Step 702) and then stores communication interruption information (the called processor number="3", the calling processor number="1", and the shared memory number="2") in the register 120 to store the communication information in a predetermined storage area in the shared memory device 2 (Step 703). As a result, the communication control instruction issued by the processor 1 is normally terminated (Step 704). Incidentally, if the called processor number="3" specified by the communication control instruction is not set to the processor connection information of the registers 110 and 120 in the shared memory device 2, this is recognized by the OS operating the processor 1 to normally terminate the communication control instruction (Step 705). As shown in FIG. 4, in the case of the system configuration in which a plurality of shared devices 2 and 21 are connected to one processor 3, when the processor 3 intends to communicate with the processor 11, there are two kinds of communication paths. That is, one communication path is; the processor 3→an interface 91→an I/O port 41→the shared memory device 21→an I/O port 51→an interface 91→the processor 11, and the other communication path is; the processor 3→an interface 8→an I/O port 5→the shared memory device 2→an I/O port 61→an interface 72→the processor 11. Therefore, in order to identify the communication route, a number of the shared memory is stored as the communication interruption information in the register 120.

After storing the communication interruption information in the register 120, the shared memory device 2 issues a communication control interruption signal to the processor 3 (Step 706). When receiving the communication control interruption signal (Step 707), the processor 3 issues an instruction for reading out the communication interruption information in the shared memory device 2 (Step 708). The shared memory device 2 feeds the communication interruption information of the register 120 to the processor 3 through the interface 8 (Step 709) and then resets a communication control interruption condition (Step 710). The processor 3 stores the communication interruption information fed from the shared memory device 2 in the primary storage in the processor 3 (Step 711) and recognizes, on the basis of the communication interruption information, what the processor 1 intends to communicate to the processor 3 through the shared memory device 2. As a result, the instruction for reading out the communication interruption information is normally terminated (Step 712).

The processor 3 applies a communication information read interruption to the processor 3 (in the example of FIG. 4, the interruption is applied to the processor 3 itself)(Step 713). When receiving the communication control interruption (Step 714), the processor 3 issues an instruction for reading out the communication information in the shared memory device 2 (Step 715), the shared memory device 2 reads out the communication information stored in a predetermined storage area, feeds it to the processor 3 through the interface 8 (Step 716), and then resets the communication information read interruption condition (Step 717). In the processor 3, the communication information fed from the shared memory device 2 is stored in the primary storage in the processor 3 (Step 718), and then the communication information read instruction is normally terminated (Step 719).

Next, the description will be given of the operation of the communication between the processors when the system which is operated with the configuration shown in FIG. 1 is shifted to the system having the configuration shown in FIG. 2. With the processor 3, through the IPL operation when shifting to the separation operation by the processors 31 and 32, the OSs operating the processors 31 and 32 store the processor connection information (the processor number="31", "32", the tag is available, and the I/O port number="5", "6") in the registers 120 and 130 in the shared memory device 2 through the interfaces 8 and 9. The series of operations of setting of the processor connection information and the recognition of the processor number are basically the same as in FIG. 6. If the OS operating the processor 1 issues the communication control instruction for specifying the called processor number="31", the shared memory device 2 and the processor 31 are thereafter operated in the same manner as in the communication between the processor 1 and the processor 3. Thus, the communication between the processor 1 and the processor 31 is continued.

Next, the description will be given of the operation when the communication is established between the virtual processor 15 simulated on the real processor 1 and the virtual processor 35 simulated on the processor 3 in FIG. 5. By the IPL operation just after the power source is turned on, the OSs which operate the real processor 1, the virtual processor 15 and the virtual processor 16, respectively, store the processor connection information (the processor number="1", "15", "16", the tag is available, and the I/O port number="4") in the registers 110, 140 and 150 in the shared memory device 2, respectively, through the interface 7. Similarly, the OSs which operate the real processor 3, the virtual processor 35 and the virtual processor 36, respectively, store the processor connection information (the processor number="3", 35", "36", the tag is available, and the I/O port number="5") in the registers 120, 160 and 170 in the shared memory device 2, respectively, through the interface 8. The series of operations of the setting of the processor connection information and the recognition of the processor number are basically the same as in FIG. 6.

In the communication between the virtual processor 15 and the virtual processor 35, the OS which operates the virtual processor 15 issues the communication control instruction for specifying the called processor number="35" in order to transfer the communication information to the virtual processor 35 to the shared memory device 2 through the interface 7 (Step 701). When receiving the communication control instruction, the shared memory device 2 retrieves the processor connection information of the registers 110, 120, 140, 150, 160 and 170 in the shared memory device 2 to recognize, on the basis of the processor connection information of the register 160, that the communication with the virtual processor 35 can be performed through the I/O port 5 and the interface 8 (Step 702), stores the communication interruption information (the called processor number="35", the calling processor number="15", and the shared memory number="2") in the register 160 and then stores the communication information in a predetermined storage area in the shared memory device 2 (Step 703). Thus, the communication control instruction issued by the virtual processor 15 is normally terminated (Step 704). Incidentally, if the called processor number="35" specified by the communication control instruction is not set to the processor connection information of the registers 110, 120, 140, 150,160 and 170 in the shared memory device 2, this is recognized by the OS operating the virtual processor 15. Thus, the communication control instruction is abnormally terminated (Step 705).

After storing the communication interruption information in the register 160, the shared memory device 2 issues the communication control interruption signal to the processor 3 (Step 706). When receiving the communication control interruption signal (Step 707), the processor 3 issues the instruction for reading out the communication interruption information in the shared memory device 2 (Step 708). The shared memory device 2 feeds the communication interruption information to the processor 3 through the interface 8 (Step 709) and then resets the communication control interruption condition (Step 710). The processor 3 stores the communication interruption information fed from the shared memory device 2 in the primary storage in the processor 3 (Step 711) and then recognizes, on the basis of the communication interruption information, that the virtual processor 15 intends to communicate with the virtual processor 35 through the shared memory device 2. Thus, the instruction for reading out the communication interruption information is normally terminated (Step 712).

The processor 3 applies the communication information read interruption to the virtual processor 35 on the basis of the above communication interruption information (Step 713). When receiving the communication information read interruption (Step 714), the virtual processor 35 recognizes that the virtual processor 15 intends to communicate with the virtual processor 35 through the shared memory device 2 to issue the instruction for reading out the communication information in the shared memory device 2 (Step 715). Then, the shared memory device 2 reads out the communication information in the predetermined storage area to feed it to the processor 3 through the interface 8 (Step 716) and then resets the communication information read interruption condition (Step 717). The virtual processor 35 stores the communication information fed from the shared memory device 2 in the virtual primary storage in the virtual processor 35 (Step 718). Thus, the instruction for reading out the communication information is normally terminated (Step 719).

Next, the description will be given of the operation when the processor 1 power supply turned off or the processor 1 is reset in FIG. 1. When the processor 1 power supply is turned off or the processor is reset, the shared memory device 2 recognizes, on the basis of the special signal in the interface 7, that the processor 1 has become inoperable, to thereby reset the tag of the processor connection information in the shared memory device 2.

According to the present embodiment, the communication between the processors which is performed through the shared memory device 2 can be performed without stopping the whole system even if the configuration of the processor is changed (the processor 3 is divided into the processors 31 and 32). Moreover, in the communication between the virtual processors, the called processor number, the calling processor number and the number of the shared memory constituting the communication path can be readily recognized. Thus, the communication between the virtual processors can be performed by the same procedure as in the communication between the real processors.

Figure 8:
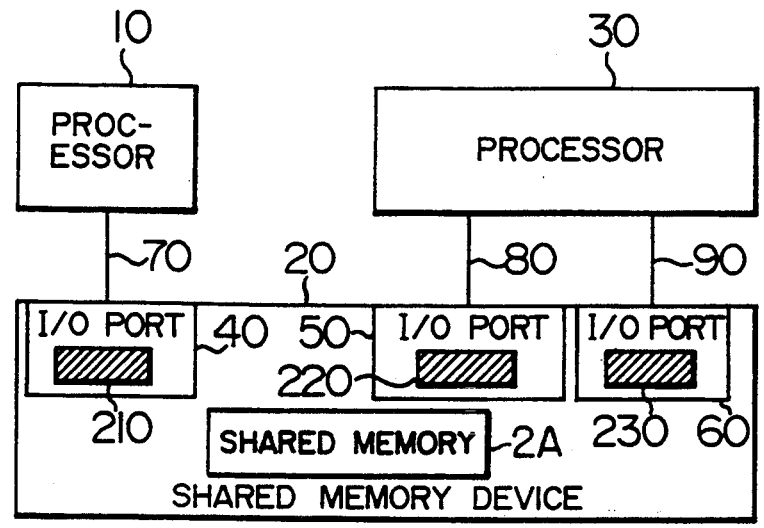
FIG. 8 is a block diagram showing a configuration of still another embodiment of the multiprocessor system according to the present invention.
Figure 9:
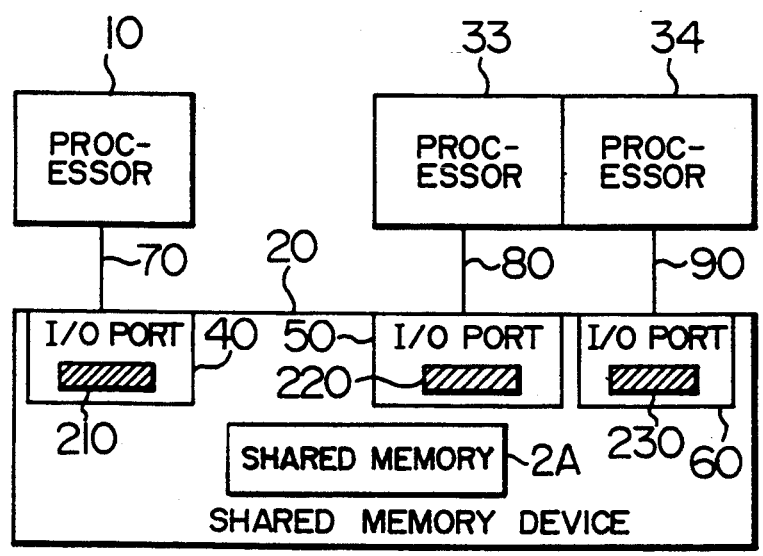
FIG. 9 is a block diagram showing a configuration of an example when one processor shown in FIG. 8 is divided into two processors.

FIG. 8 is a block diagram showing a configuration of still another embodiment in which a processor 10 and a processor 30 are connected to a shared memory device 20. The processor 10 performs read/write from or to the shared memory device 20 through an interface 70. The processor 30 has two interfaces 80 and 90 for the shared memory device 20. This configuration is basically the same as that of the embodiment of FIG. 1. But, registers 210, 220 and 230 for storing the processor connection information are disposed in I/O ports 40, 50 and 60, respectively. Further, as shown in FIG. 9, when the processor 30 is operated having been divided into two independent processors 31 and 32, the interfaces 80 and 90 are independently operated in correspondence to processors 33 and 34, respectively.

In FIG. 8, the processor 30 is generally made up of a plurality of instruction processing units. One of the interfaces 80 and 90 is used depending on which of the instruction processing units were the read/write instruction from or to the shared memory.

Figure 10:
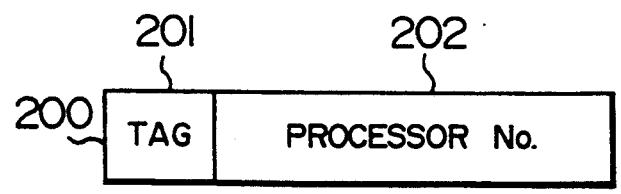
FIG. 10 is a view showing the arrangement of the contents of processor connection information stored in an I/O port of the shared memory.

In the shared memory device 20, the I/O ports 40, 50 and 60 are provided in the interfaces 70, 80 and 90, respectively, and the registers 210, 220 and 230 for storing port information 200 having the format as shown in FIG. 10 are prepared in the I/O ports 40, 50 and 60. In FIG. 10, a tag 201 indicates whether or not the processor number set to the register of interest is proper, and a processor number 202 represents a number of the processor connected to the I/O port of interest.

The description will hereinbelow be given to the operation when the communication between the processor 10 and the processor 30 is established through the I/O ports 40 and 50 of the shared memory device 20.

Figure 11:
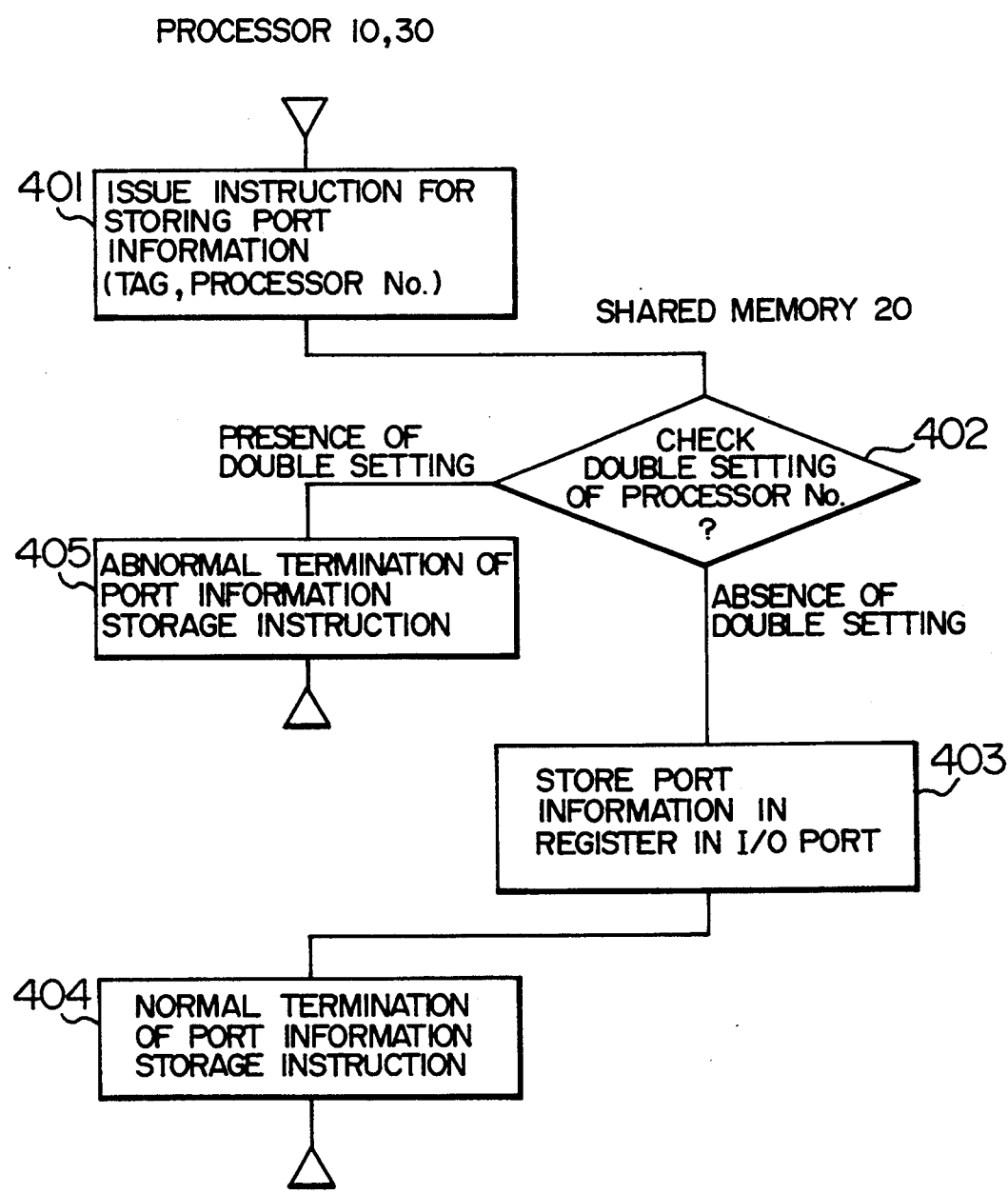
FIG. 11 is a view showing a processing flow chart for setting processor connection information in the system shown in FIG. 9.

First, the description will be given of the operation of setting the port information to the registers 210 and 220 in the I/O ports 40 and 50 of the shared memory device 20, upon referring to the flow chart of FIG. 11. Immediately after the power supply is turned on, in the shared memory device 20, the values of the processor numbers of the registers 210, 220 and 230 prepared in the I/O ports 40, 50 and 60 are not guaranteed, and the corresponding tags are reset.

In the initial program load (IPL) just after the power supply is turned on, an OS which operates the processor 10 issues an instruction for storing the port information (the tag is available, and the processor number="10") in the register 210 in the I/O port 40 through the interface 70 (Step 401). The shared memory device 20 confirms that the processor number="10" is not set to the I/O ports 50 and 60 (Step 402) and then stores the specified port information (the tag is available, and the processor number="10") in the register 210 in the I/O port 4 (Step 403). The processor 10 recognizes the storage of the port information in the shared memory device 20 to normally terminate the port information storing instruction (Step 404). Incidentally, if the same processor number as that of the processor 10 is set to the I/O ports 50 and 60, in the processor 10, the port information storing instruction is abnormally terminated (Step 405). In the same manner, an OS which operates the processor 30 issues an instruction for storing port information (the tag is available, and the processor number="30") in the register 220 in the I/O port 50 through the interface 80 (Step 401). The shared memory device 20 confirms that the processor number="30" is not set to the I/O ports 40 and 60 (Step 402) and then stores the specified port information (the tag is available, and the processor number="30") in the register 220 in the I/O port 50 (Step 403). In the processor 30, this is recognized to normally terminate the port information storing instruction (Step 404). Moreover, if the same processor number as that of the processor 30 is set to the I/O ports 40 and 60, the port information storing instruction is abnormally terminated (Step 405).

The above operations of setting the port information are performed individually in the shared memory to prevent the double setting. Moreover, while not illustrated in FIG. 11, in the IPL, each of the OSs which operate the processors 10 and 30 registers its processor number in a common storage area in the shared memory device 20 in order to note that it is connected to the shared memory device 20. Incidentally, in the system generation, such a processor number is previously set so as not to be repeated. Therefore, before the communication between the processors is started, by reading out the contents of the common storage area, the OSs of the processors can recognize the processor which is connected to the shared memory device 20.

Figure 12:
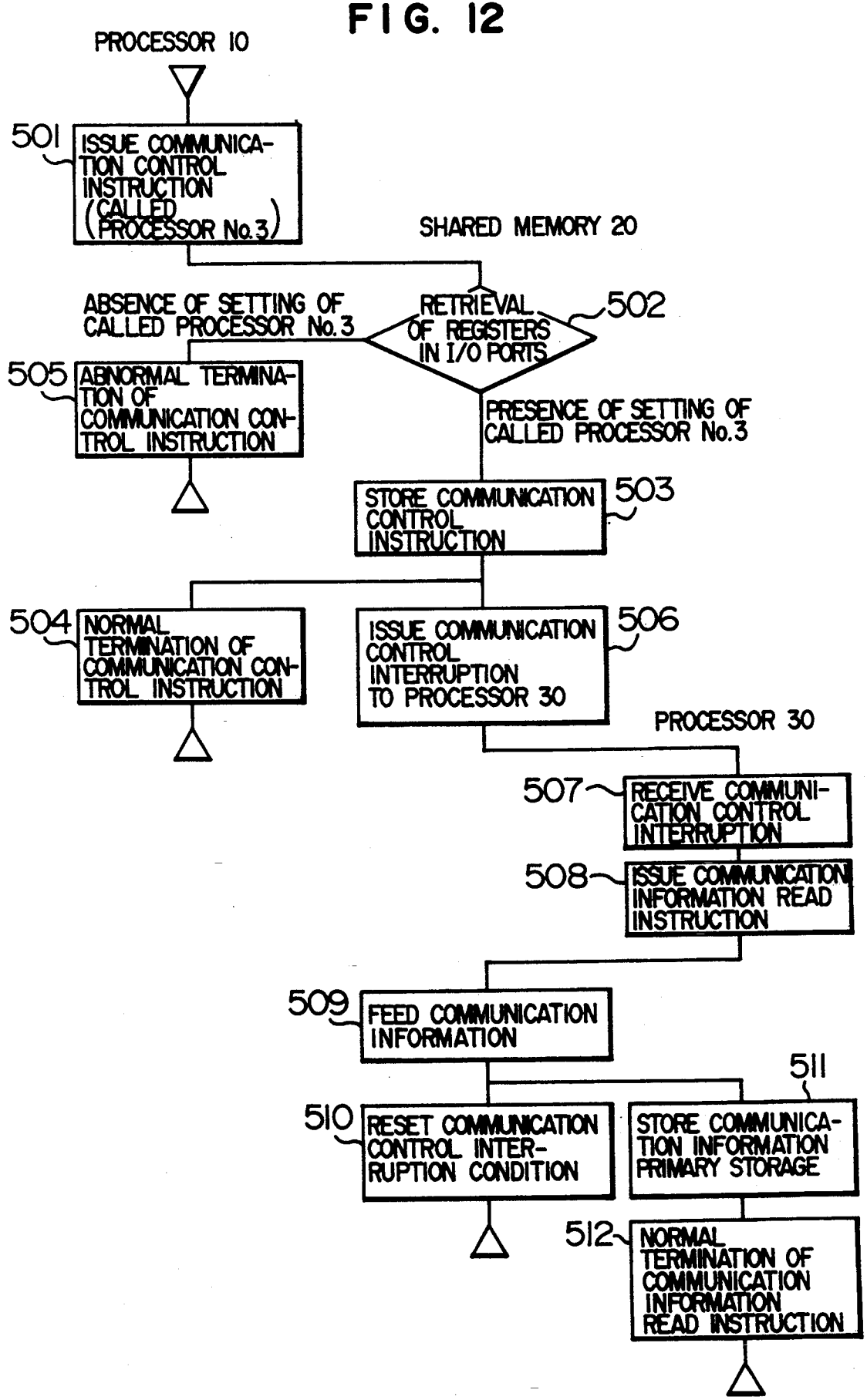
FIG. 12 is a view showing a processing flow chart useful in explaining communication between processors in the system of FIG. 9.

Next, the description will be given of the operation of transferring the communication information from the processor 10 to the processor 30 through the I/O ports 40 and 50 of the shared memory device 20, on referring to FIG. 12.

The OS which operates the processor 10 issues a communication control instruction for specifying the called processor number="30" in order to transfer the communication information to the processor 30 to the shared memory device 2 through the interface 70 (Step 501). When receiving the communication control instruction, the shared memory device 20 retrieves the port information of the registers 210, 220 and 230 in the I/O ports 40, 50 and 60 to recognize, on the basis of the port information of the register 220, that the processor 10 can communicate with the processor 30 through the I/O port 50 and the interface 80 (Step 502) and then stores the communication information in a predetermined storage area in the shared memory device 20 (Step 503). Thus, the communication control instruction issued by the processor 10 is normally terminated (Step 504). Incidentally, if the called processor number="30" specified by the communication control instruction is not set to the port information of the registers 210, 220 and 230 in the I/O ports 40, 50 and 60, this is recognized by the OS operating the processor 10. Then, the communication control instruction is abnormally terminated (Step 505).

After storing the communication information in a predetermined storage area, the shared memory device 20 issues a communication control interruption signal to the processor 30 (Step 506). When receiving the communication control interruption signal (Step 507), the processor 30 issues an instruction for reading out the communication information in the shared memory device 20 (Step 508). The shared memory device 20 reads out the communication information in the predetermined storage area, feeds it to the processor 30 through the interface 80 (Step 509) and resets a communication control interruption condition (Step 510). The processor 30 stores the communication information fed from the shared memory device 20 in the primary storage in the processor 30 (Step 511). Thus, the communication information read instruction is normally terminated (Step 512).

Next, the description will be given of the communication between the processors when the system which is operated with the configuration shown in FIG. 8 is shifted to the system having the configuration shown in FIG. 9. With the processor 30, through the IPL operation in the shift to the separate operation by the processors 33 and 34, the OSs which operate the processors 33 and 34, respectively, store the port information (the tag is available, and the processor number="33", "34") in the registers 220 and 230 in the I/O ports 50 and 60 through the interfaces 80 and 90, respectively, and store their processor numbers in the common storage area in the shared memory device 20. The series of operations of the setting of the port information and the recognition of the processor number are basically the same as in FIG. 11. Only if the OS which operates the processor 10 issues the communication control instruction for specifying the called processor number="33", the shared memory device 20 and the processor 33 are hereinafter operated in the same procedure as in the communication between the processor 10 and the processor 30 as described on referring to FIG. 12. Thus, the communication between the processor 10 and the processor 3 is continued.

Next, the description will be given of the operation when the processor 10 is power supply is turned off or the processor 10 is reset in FIG. 8. When the processor 10 power supply is turned off or the processor is reset, the shared memory device 20 recognizes, on the basis of the special signal in the interface 70, that the processor 10 has been rendered inoperable and then resets the tag of the port information of the register 210 in the I/O port 40.

According to the present embodiment, the communication between the processors which is performed through the shared memory device 20 can be performed without interrupting the whole system even if the configuration of the processor is changed (the processor 30 is divided into the processors 33 and 34).

According to the present invention, in the loosely coupled multi-processor system, the communication between the processors which is performed through the shared memory can be performed without stopping the whole system even if the system configuration or the like is changed. Therefore, conversely, the change of the connection path between the shared memory and the processor, or the change of the processor number can be also performed without interrupting the whole system.

Moreover, according to the present invention, the calling processor can readily recognize that the called processor is rendered inoperable due to turning off the power supply, resetting the processor or the like.

Further, according to the present invention, the double setting of the same processor number in the two or more registers in the shared memory can be prevented.

Further, according to the present invention, it is possible that a plurality of processors are connected to one I/O port in appearance, and therefore, the communication between the virtual processors can be performed in the same procedure as that of the communication between the real processors.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A method of communication between processors used with an information processing system having a plurality of processors and a plurality of shared memories connected to said plurality of processors, said method comprising the steps of:

storing information from a processor for specifying which of said plurality of processors is connected to said shared memories to be directly accessible from another processor, into register means when said system is started by turning on a power supply to said system, or when said system is started just after connection paths between said shared memories and said processors are changed;

feeding a communication instruction from one of said processors to a specified one of said shared memories for indicating that said one of said processors communicates with another processor via said specified shared memory;

checking said information stored in said register means by said specified shared memory, in response to said communication instruction, and confirming by said specified shared memory that said one processor and said another processor are connected to said specified shared memory such that said specified shared memory is directly accessible from either of said one processor and said another processor;

storing communication information from said one processor into a memory area of said specified shared memory, after confirming that said one processor and said another processor are connected to said specified shared memory such that said specified shared memory is directly accessible from either of said one processor and said another processor;

feeding a communication read interruption from said specified shared memory to said another processor; and reading out, in response to said communication read interruption, said communication information from said memory area of said specified shared memory by said another processor and storing said communication information in a primary storage of said another processor.

2. An information processing system according to claim 1, wherein said shared memory recognizes that a processor connected to an associated I/O port or ports is ineffective when said processor is turned-off or reset.

3. An information processing system according to claim 2, wherein said information for specifying a processor includes an identification number of said processor and an identification number of said I/O port or ports to which said processor is connected, and when said information for specifying the processor is stored in said register means in said shared memory, said information is checked over all of said register means as to whether the identification numbers have already been stored in said register means, and if the identification numbers have been already stored in said register means, an abnormal termination is performed in said system.

4. A method of communication between processors used with an information processing system having a plurality of real processors and a shared memory connected to said plurality of processors, each of said real processors including therein a plurality of virtual processors, said method comprising the steps of:

- storing information from one of said virtual processors for specifying which of said virtual processors in said real processors is connected to said shared memory to be directly accessible from another real processor, into register means when said system is started by turning on a power supply to said system, or when said system is started just after connection paths between said shared memory and said processors are changed;
- feeding a communication instruction from one of said virtual processors in said plurality of real processors to said shared memory for indicating that said one virtual processor communicates with another of said virtual processors in said real processors via said shared memory;
- checking said information stored in said register means by said shared memory, in response to said communication instruction, and confirming by said shared memory that said one virtual processor and said another virtual processor are connected to said shared memory such that said shared memory is directly accessible from either of said one virtual processor and said another virtual processor;
- storing communication information from said one virtual processor into a memory area of said shared memory, after confirming that said one virtual processor and said another virtual processor are connected to said shared memory such that said shared memory is directly accessible from either of said one virtual processor and said another virtual processor;
- feeding a communication read interruption from said shared memory to the real processor having said another virtual processor;
- feeding said communication read interruption from said real processor having said another virtual processor to said another virtual processor; and
- reading out, in response to said communication read interruption, said communication information from said memory area of said shared memory by said another virtual processor and storing said communication information in a primary storage of said another virtual processor.

5. An information processing system according to claim 4, wherein said shared memory recognizes that the real processor connected to an associated I/O port or ports is ineffective when said real processor is turned-off or reset.

6. An information processing system according to claim 5, wherein said information for specifying said virtual processor includes an identification number of said virtual processor and an identification number of the I/O port or ports to which said real processor having the virtual processor is connected, and when said information for specifying the virtual processor is stored in said register means in said shared memory, it is checked over all of said register means as to whether the identification numbers have been already stored in said register means, and if the identification numbers have been already stored in said register means, an abnormal termination is performed in said system.

* * * * *